2,946,656

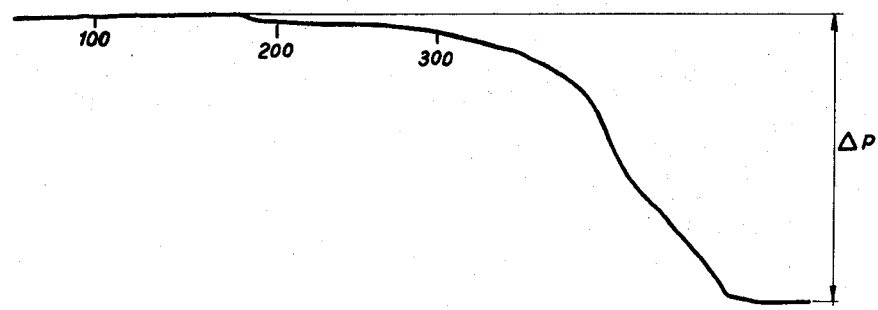
Fig: 1
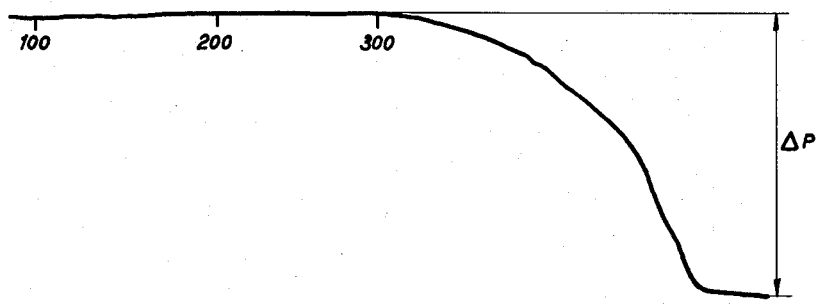
Fig: 2
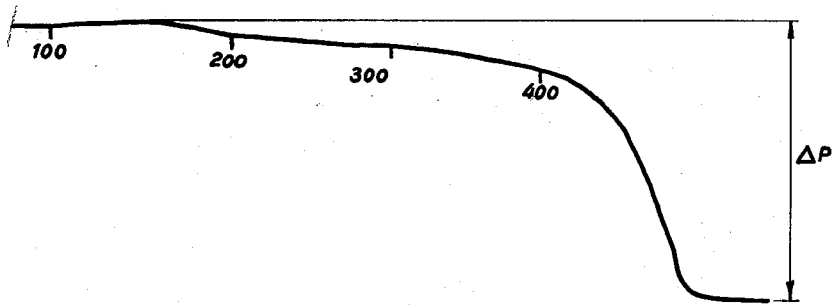
Fig: 3

DIBASIC ALKALINE EARTH METAL PHOSPHATE AND LUMINESCENT POWDERS CONTAINING SUCH PHOSPHATE

Willy Schreurs, Brussels, Belgium, assignor to Ateliers de Constructions Electriques de Charleroi, Brussels, Belgium, a Belgian company Filed Feb. 21, 1956, Ser. No. 566,971

Claims priority, application France Feb. 22, 1955

4 Claims. (Cl. 23—109)

This invention relates to dibasic alkaline earth metal phosphates and is more particularly concerned with a process for producing such phosphates in pure form which may be used to produce luminescent or fluorescent powders of high luminosity.

Luminescent or fluorescent powders in which the principal constituent is a phosphate, and more particularly a phosphate of calcium or other alkaline-earth metal, have previously been made, such powders being commonly obtained by calcination. A starting material which has been utilized for the preparation of these fluorescent phosphates is dibasic calcium phosphate ($CaHPO_4$).

It is possible to buy such phosphates in analytically pure form but they are very expensive. However, when one attempts to purify the "commercially pure" materials, as by precipitating the dibasic alkaline-earth metal phosphate in known manner by the introduction of a solution of an alkaline-earth metal chloride into a solution of ammonium phosphate, the precipitate obtained does not generally consist of a pure dibasic phosphate. This is clearly evident by the variation in tints and luminosity of fluorescent powders prepared from mixtures containing dicalcium phosphate derived from different precipitated batches.

One object of the present invention is to avoid the aforesaid drawback and to provide a process for the manufacture of pure dibasic alkaline-earth metal phosphates from commercially available compounds, which can be reproduced with very great fidelity to provide uniform results at all times.

Another object of the invention is to provide a process for the manufacture of pure dibasic alkaline-earth metal phosphates which provide maximum luminosity when employed as fluorescent powders.

It is a further object of the invention to provide luminescent products in which there is added in the course of manufacture, for example before the calcination step, phosphates prepared in the manner to be described.

According to the invention, insoluble dibasic alkaline-earth metal phosphates are precipitated by reacting an aqueous solution of a water-soluble phosphate with an aqueous solution of a water-soluble alkaline-earth metal salt, precipitation being effected in an aqueous medium having a pH-value which is maintained at a constant predetermined value by a continuous and controlled addition of gaseous ammonia.

Specifically, when starting from a solution of ammonium phosphate and a solution of calcium chloride, in order to obtain dibasic calcium phosphate for example, the pH-value of the medium is maintained in the vicinity of 5.05 and preferably between 5.0 and 5.1.

Again, when starting from a solution of ammonium phosphate and a solution of barium chloride, in order to obtain dibasic barium phosphate, the pH-value of the medium is maintained in the vicinity of 7.3, and preferably between 7.2 and 7.4.

The invention will be described hereinafter with specific reference to the preparation of dibasic calcium phosphate, although it will be understood that the invention is not limited to this phosphate and that other dibasic alkaline-earth metal phosphates may be prepared in like manner.

The process of manufacture as illustrated by the following specific example comprises preparation of a calcium chloride solution, preparation of an ammonium phosphate solution, and precipitation of dibasic calcium phosphate under controlled pH conditions.

750 kg. of limestone are first dissolved in a suitable amount (about 2500 kg.) of concentrated hydrochloric acid to provide a solution of calcium chloride having a pH-value of 1. In order to purify this raw solution, there are added 60 liters of 100% hydrogen peroxide, 5 kg. of technical barium chloride, 100 kg. of infusorial earth, and 2 liters of commercial phosphoric acid.

After bringing the pH value to 9 by introduction of gaseous ammonia, the solution is filtered, neutralized to pH value 7 by the addition of conc. hydrochloric acid, and diluted to 3,000 liters with water. There is thus obtained a pure solution of calcium chloride (2.5 mols per liter).

In a separate vessel, 500 liters of commercial phosphoric acid are diluted to 2,000 liters by adding water. In order to purify this solution there are introduced 1 kg. of barium chloride, 2 liters of 100% hydrogen peroxide, and 3 liters of the above-mentioned pure solution of calcium chloride. After adjusting the pH value to 8 by the addition of gaseous ammonia, the solution is filtered and acidified to a pH value 5.0 by means of conc. hydrochloric acid. There is thus obtained a solution of dibasic ammonium phosphate (2.2 mols. per liter).

Before precipitation, 1,000 liters of pure water are added to 1,000 liters of the dibasic ammonium phosphate thus obtained.

While this solution of ammonium phosphate is being vigorously agitated, the pure solution of calcium chloride is introduced slowly, this being effected at normal room temperature. During the resulting precipitation of dicalcium phosphate, the pH value of the medium tends to fall, but this value is maintained strictly between the values 5.0 and 5.1 by continuously adding gaseous ammonia. When the precipitation of the dicalcium phosphate is complete, which is indicated by a tendency of the pH value to rise, the precipitate is drained off, washed with pure water to eliminate chlorides, and then dried at 200° C.

If the pH value departs from the optimum figure, viz. between 5.0 and 5.1, in the course of the precipitation, the precipitate is contaminated. The impurity is probably tricalcium phosphate if the reaction takes place in an overly basic medium, but if the reaction takes place in an overly-acid medium, the impurity is probably monocalcium phosphate.

Figs. 1, 2 and 3 of the accompanying drawing are graphs of values obtained on the thermobalance by heating progressively three different samples of dicalcium phosphate. The temperatures in ° C. are shown as abscissae, and as ordinates are shown the losses in weight $\Delta P$, the greatest loss being shown at the bottom of each of the graphs.

Fig. 1 is a graph read on the thermobalance of a sample precipitated in an overly-acid medium (pH value between 4.4 and 4.6). According to this graph, the sample begins to lose weight below 200° C. and the curve has the appearance of being composed of three distinct or superposed curves. It is therefore reasonable to conclude that there is present a large proportion of an impurity. The loss of total weight and the threshold temperature suggest contamination by monocalcium phosphate.

Fig. 2 shows the loss of weight of a sample precipitated in a medium at an optimum pH value 5.0 to 5.1. The curve is of simple form and very regular, indicating but a single compound. The loss of weight does not begin until a temperature of approximately 300° C. is reached and corresponds to the loss of water for dicalcium phosphate. Owing to the threshold temperature of 300° C., it is possible to dry the precipitate at 200° C. without driving off the water of combination.

Fig. 3 shows the loss of weight of a sample precipitated in an overly-basic medium (pH value 5.5 to 5.6). The sample shows a marked loss of weight below 200° C. and the curve has the appearance of being composed of two distinct curves superposed. It is therefore reasonable to assume the presence of an impurity. The loss of total weight and the threshold temperature suggest contamination by tricalcium phosphate.

The harmful effect of impurities consisting of monobasic and tribasic phosphate in the dibasic phosphate, as indicated by the graphs shown in Figs. 1 and 3, makes itself felt in the luminous efficiency of powders formed from the dibasic phosphate when used in fluorescent lamps. The table below gives an example of luminosity with powders manufactured from pure dibasic phosphate prepared in accordance with the present invention and from dibasic phosphate contaminated by tribasic or monobasic phosphate.

| Phosphate | Luminosity of the powders, percent | Luminous efficiency of the lamps | |
|---|---|---|---|
| | | after 2 hours, l./w. | after 100 hours, l./w. |
| Pure $CaHPO_4$ | 100 | 61 | 59.5 |
| $CaHPO_4 + 1.1\% Ca_3(PO_4)_2$ | 93 | 55 | 52 |
| $CaHPO_4 + 3.4\% Ca_3(PO_4)_2$ | 91.5 | 54 | 50.5 |
| $CaHPO_4 + 5.8\% Ca_3(PO_4)_2$ | 83 | 47 | 44.5 |
| $CaHPO_4 + 0.9\% Ca(H_2PO_4)_2$ | 99 | 57 | 50 |
| $CaHPO_4 + 2.7\% Ca(H_2PO_4)_2$ | 95 | 53 | 49.5 |
| $CaHPO_4 + 4.6\% Ca(H_2PO_4)_2$ | 94 | 53 | 50 |

It is noted that the maximum luminosity is obtained only in the case of the powder containing pure dibasic calcium phosphate ($CaHPO_4$).

The alkaline earth metal dibasic phosphate produced in accordance with the invention is used in the manufacture of luminescent or fluorescent powders by using it as the phosphate in conventional formulations and subjecting the formulation to conventional treatment. For example, the phosphate is mixed with a fluoride of calcium and/or strontium, a manganese compound such as manganese chloride, and an antimony compound such as antimony trioxide, thoroughly mixing these constituents, and then calcining the mixture, e.g. at a temperature of 1170° C. for 4 to 5 hours. After cooling, the mass is ground and is then incorporated in fluorescent lamps or similar luminescent devices.

When the fluorescent powder is to contain pyrophosphates, it is merely necessary to calcine a mixture of a dibasic phosphate according to the invention with conventional activators and with known fluxes. When the powder is to contain orthophosphate, it is likewise possible to obtain it from the dibasic phosphate by adding, for example, a suitable quantity of a carbonate such as calcium carbonate.

As previously mentioned, the pH-value at which precipitation of the alkaline earth metal dibasic phosphate is effected varies from metal to metal, being 5.0 to 5.1 for calcium and 7.2 to 7.4 for barium. The pH ranges for the other alkaline earth metals to which the present invention is applicable are determinable. The alkaline earth metal may be introduced not only in the form of a halide, e.g. a chloride, but may also be in the form of other water-soluble salts such as nitrate. The quantities of the water-soluble phosphate and the water-soluble alkaline earth metal salt which are employed are preferably the stoichiometric quantities required for the particular reaction involved, although a slight excess, e.g. one percent of either constituent is not disadvantageous. It will also be understood that it is not necessary to prepare the solution of the soluble phosphate and the solution of the soluble alkaline earth metal compound to be used in the precise manner shown in the above-described specific example and that only aqueous solution of these constituents in pure form may be used.

It will thus be obvious that various changes and modifications may be made in the process herein described without departing from the scope of the invention as defined in the appended claims and it is intended, therefore, that all matter contained in the foregoing description and in the drawing shall be interpreted as illustrative only and not as limitative of the invention.

What I claim and desire to secure by Letters Patent is:

1. The process for the manufacture of dicalcium phosphate by precipitation from an aqueousu medium which comprises slowly introducing an aqueous solution of a pure calcium chloride into an aqueous solution of pure ammonium phosphate and, simultaneously with the introduction of said aqueous solution of said calcium chloride, continuously adding gaseous ammonia to the aqueous medium in a quantity to maintain the pH of the aqueous medium at 5.0 to 5.1 until the completion of the precipitation of said dicalcium phosphate.

2. The process for the manufacture of dibarium phosphate by precipitation from an aqueous medium which comprises slowly introducing an aqueous solution of a pure barium chloride into an aqueous solution of pure ammonium phosphate and, simultaneously with the introduction of said aqueous solution of said barium chloride, continuously adding gaseous ammonia to the aqueous medium in a quantity to maintain the pH of the aqueous medium at 7.2 to 7.4 until the completion of the precipitation of said dibarium phosphate.

3. The process for the manufacture of dicalcium phosphate by precipitation from an aqueous medium which comprises slowly introducing an aqueous solution of a pure calcium chloride into an aqueous solution of pure ammonium phosphate and, simultaneously with the introduction of said aqueous solution of said calcium chloride, continuously adding gaseous ammonia to the aqueous medium in a quantity to maintain the pH of the aqueous medium at about 5.05 until the completion of the precipitation of said dicalcium phosphate.

4. The process for the manufacture of dibarium phosphate by precipitation from an aqueous medium which comprises slowly introducing an aqueous solution of a pure barium chloride into an aqueous solution of pure ammonium phosphate and, simultaneously with the introduction of said aqueous solution of said barium chloride, continuously adding gaseous ammonia to the aqueous medium in a quantity to maintain the pH of the aqueous medium at about 7.3 until the completion of the precipitation of said dibarium phosphate.

References Cited in the file of this patent

UNITED STATES PATENTS

| | | |
|---|---|---|
| 1,701,110 | Hofmann | Feb. 5, 1929 |
| 1,701,265 | Hofmann | Feb. 5, 1929 |
| 1,913,539 | Friedrich | June 13, 1933 |
| 1,999,026 | Tramm et al. | Apr. 23, 1935 |
| 2,427,728 | Jenkins et al. | Sept. 23, 1947 |
| 2,482,450 | Wells | Sept. 20, 1949 |
| 2,544,664 | Fortney et al. | Mar. 13, 1951 |
| 2,656,266 | Calmeyer | Oct. 20, 1953 |
| 2,664,401 | McKeag et al. | Dec. 29, 1953 |
| 2,726,949 | Andres et al. | Dec. 13, 1955 |